Figure 1:
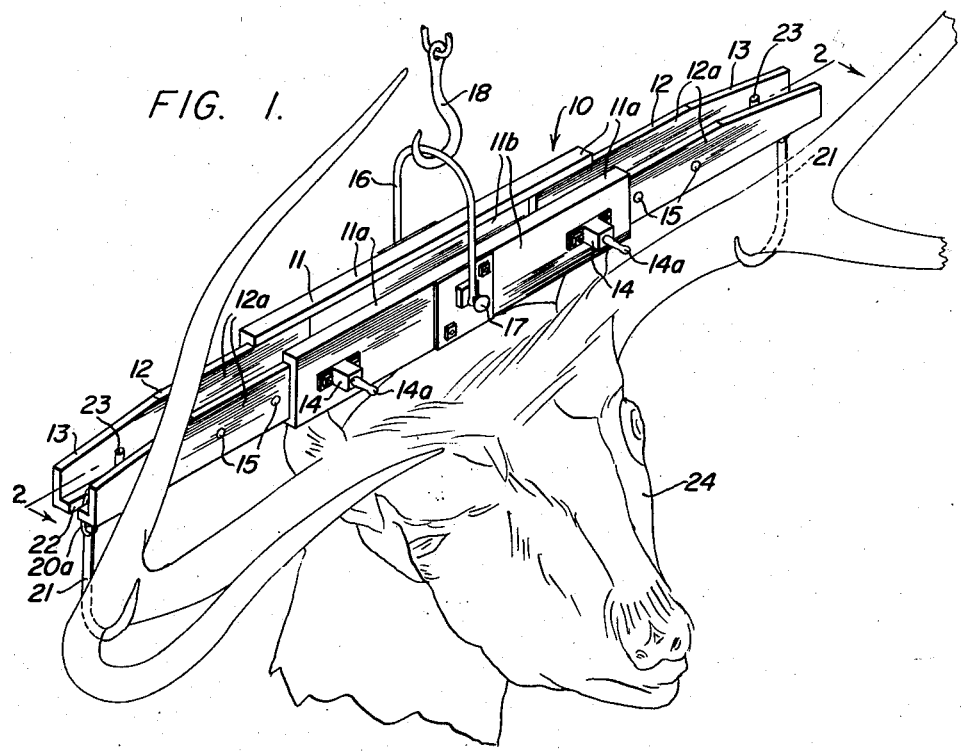

June 9, 1959 — D. L. MINCEY — 2,890,078
HANGER FOR BIG GAME
Filed Nov. 19, 1956 — 2 Sheets-Sheet 1

INVENTOR.
DWAIN L. MINCEY
ATTORNEYS

June 9, 1959 D. L. MINCEY 2,890,078
HANGER FOR BIG GAME
Filed Nov. 19, 1956 2 Sheets-Sheet 2
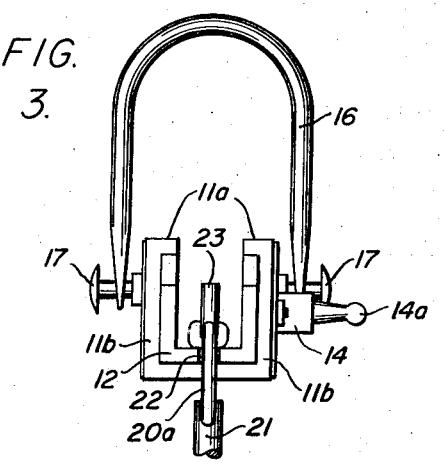
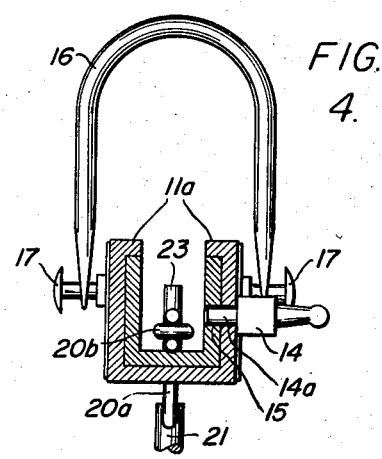
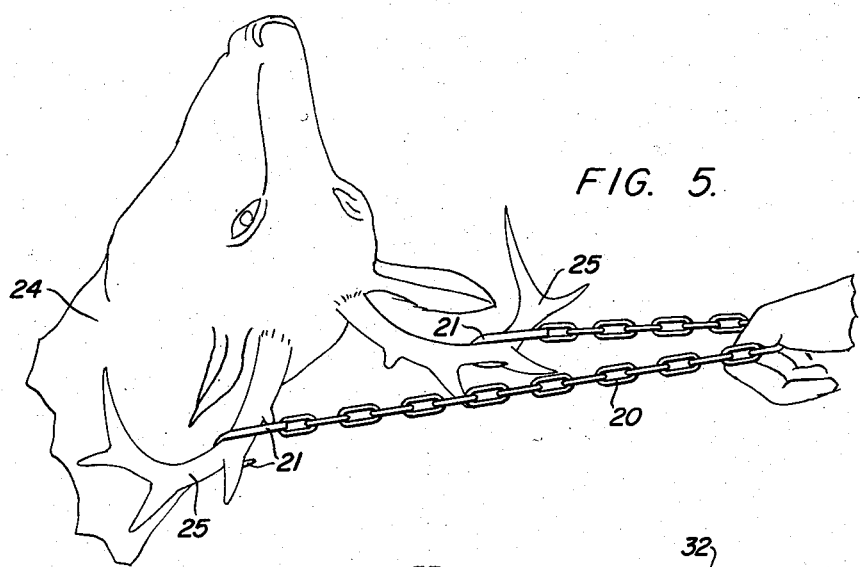
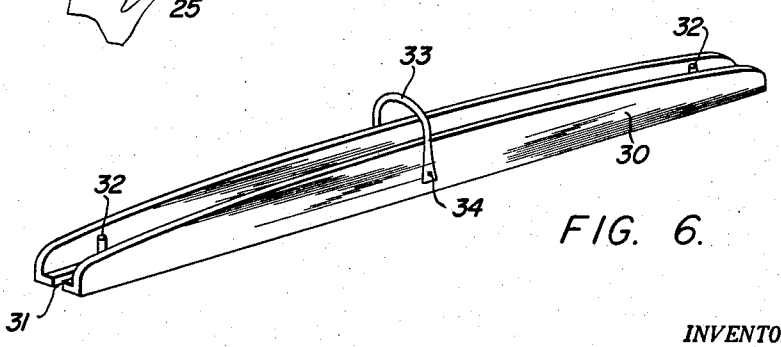
INVENTOR.
DWAIN L. MINCEY
ATTORNEYS United States Patent Office 2,890,078
Patented June 9, 1959

2,890,078

HANGER FOR BIG GAME

Dwain L. Mincey, Ogden, Utah

Application November 19, 1956, Serial No. 623,216

10 Claims. (Cl. 294—79)

This invention relates to devices for hanging up big game and livestock kill to facilitate cleaning and skinning, and, in the case of big game particularly, to protect against molestation by predatory animals until the opportunity arises for removing the kill.

While a variety of types of meat hooks and hangers have been developed in the past for the meat packing industry, none of these are appropriate for handling big game. Moreover, none offers the advantageous features of the present invention, whatever the use.

The principal object of the invention is to provide a suspension hanger construction capable of serving a double purpose, namely, to facilitate the dragging of a dead animal from place to place, manually or otherwise, and to securely suspend the dead animal in the air, usually by means of its horns.

An outstanding feature of the invention is the provision, as part of the suspension hanger, of a chain having hooks at opposite ends thereof to serve both as an attachment anchorage for dragging purposes and as suspension means. Such chain is separable from the hanger proper, so that it may easily serve its dual purpose. Provision is made on the hanger proper for securing the chain, with its hook ends dangling in a manner appropriate for animal-suspension purposes.

An optional feature of the invention is to provide adjustability for the hanger proper, so that the chain may be adjusted in its suspension role to best fit any given animal for size.

These and additional objects and features of the invention will become clear from the following detailed description of the presently preferred embodiments of the invention illustrated in the accompanying drawings.

Figure 2:
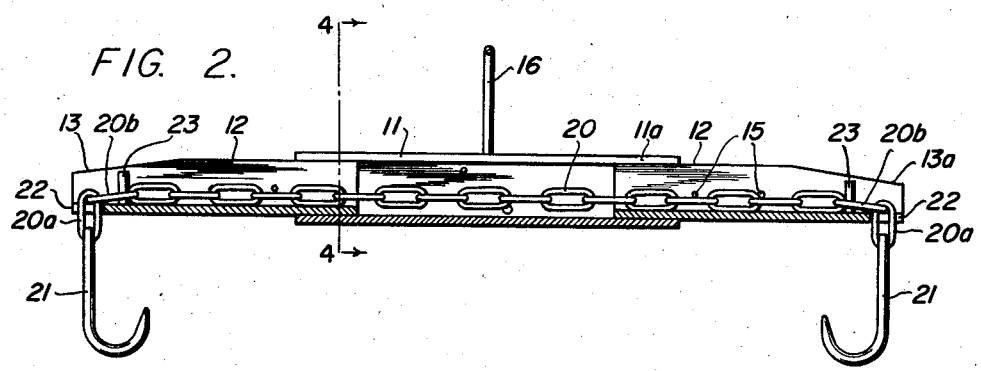

In the drawings:

Fig. 1 represents a front perspective view of an adjustable form of the suspension hanger of the invention as it appears in use, suspending the body of a deer;

Fig. 2, a vertical longitudinal section taken on the line 2—2 of Fig. 1;

Fig. 3, an end elevation of the suspension hanger, with the animal removed and with depending portions of the hooks broken away;

Fig. 4, a view corresponding to that of Fig. 3, but showing a transverse section taken on the line 4—4 of Fig. 2;

Fig. 5, a perspective view of the chain member of the device being used to drag a game animal; and Fig. 6, a perspective view corresponding to that of Fig. 1, but showing the hanger, only, of another embodiment of the device which is not adjustable in its transverse spread, as in the first embodiment.

Referring now to the drawings:

In the presently preferred construction of the adjustable form of the device shown in Figs. 1-4, a hanger member 10 of adjustable length channel formation is made up of an elongate central channel section 11 and a pair of elongate opposite end channel sections 12 slidably received by the central section 11.

For retaining the received end sections 12, the central section 11 is provided with inturned flanges 11a at the upper ends of its upstanding sides 11b. As indicated at 13, the outer ends of such end sections 12 may be tapered outwardly and downwardly, for the sake of appearance and to facilitate access to their interiors.

The thus telescopically interfitted hanger sections 11 and 12 are provided with locking means for rigidly retaining any given adjusted position of the hanger member 10. In the construction illustrated, such locking means take the form of conventional spring-pressed pin latches 14, respectively, whose manually manipulatable pins 14a are normally resiliently urged into mating relationship with selected keeper holes of respective longitudinal series of keeper holes 15 through the proximate walls 11b of the hanger end sections 12, see particularly Fig. 4.

Means are provided for suspending the hanger member 10 from some convenient overhead support. As illustrated, a bail member 16 extends transversely across hanger section 11 centrally of its length and is pivotally secured thereto by means of attachment fittings 17. Such bail 16 is cradled in a hook 18 that is part of a block and tackle used to suspend the animal from any convenient support (not shown), such as the branch of a tree.

The hanger device of the invention includes an elongate and flexible suspension member, having animal-engaging hooks at its opposite ends and being adapted to hang over the hanger member of the device, longitudinally thereof, with its intermediate portion resting on the latter and its hooks hanging pendant.

While the flexible suspension member may take various forms and may be made up from various materials, it is preferred that it be a link chain, such as that indicated 20, having hooks 21 articulatively secured to its end links 20a, respectively.

The outer ends of the channel bottom 12b of the respective hanger end sections 12 are advantageously slotted inwardly for receiving opposite end portions of the flexible suspension member in the resulting slots 22. This stabilizes the flexible suspension member within the hanger member and prevents transverse movement thereof relative to the latter. In the illustrated instance, the portions of the flexible suspension member received by the respective slots 22 are the terminal links 20a of the chain 20, see particularly Fig. 2.

Means are provided on the hanger member, preferably adjacent the respective slotted end portions thereof, for anchoring the flexible suspension member against longitudinal movement. In the construction illustrated, such means take the form of posts 23 rigidly upstanding from the bottom 12b of the respective hanger end sections 12 just inwardly from the inner terminations of the slots 22. Chain links 20b next to the respective terminal links 20a are placed over the posts 23, respectively, see Fig. 2, thereby accomplishing the desired anchorage of the flexible suspension member.

With the length of the hanger member 10 properly adjusted for the particular animal concerned, for example, the deer indicated at 24 in Fig. 1, and with the chain 20 anchored within the hanger member as described above, the freely dangling hooks 21 are brought into engagement with the antlers or some other suitable part of the animal and the body of the animal is hoisted to a suitably elevated position, as by means of a block and tackle to which the suspension hook 18 is attached.

It should be noted that the adjusted position illustrated in Figs. 1 and 2 is the maximum length position of the particular device illustrated, and that the full length of the chain 20 is engaged by the hanger member in such maximum length position. It will be realized, of course, that, for the lesser length adjustments provided by the hanger member 10, more of the chain 20 will hang pendant at opposite ends of the hanger member, and other links of the chain will be involved in the anchorages provided for by the slots 22 and posts 23.

As noted hereinbefore, one of the advantages of the device of the invention is that the flexible suspension member may be removed from the hanger member and used independently in the dragging of an animal from place to place. This is illustrated in Fig. 5, where the hooks 21 of the chain 20 are shown engaging opposite antlers 25 of a big game animal 26 and the intermediate portion of the chain is shown grasped by a hunter in the act of dragging the animal.

It is not necessary that the hanger member of the device be adjustable in length. As shown in Fig. 6, the hanger member 30 is of unitary construction and of a length predetermined for a particular type of game animal. Constructing the device in this manner is quite satisfactory for the average hunter who does only one type of hunting.

The device of Fig. 6 is similar in all essential respects to that of Figs. 1 through 5. While no flexible suspension member is shown in this instance, it is to be understood that the chain 20 of the preceding figures may be employed. Slot and post anchorages 31 and 32, respectively, are similar to those of the preceding embodiment. In this instance, the bail 33 has a simplified pivotal attachment to the hanger member 30, as indicated at 34.

Whereas this invention is here illustrated and described with respect to specific embodiments thereof, it should be realized that changes may be made within the scope of the following claims, without departing from the essential contributions to the art made by the teachings hereof.

I claim:

1. A hanger device for animals, comprising an elongate and rigid hanger member having its opposite ends slotted inwardly longitudinally of the hanger member for receiving respective opposite end portions of an elongate and flexible suspension member disposed upon and extending along said hanger member; means superimposed upon said hanger member intermediate its width and adjacent the respective slotted ends thereof for anchoring said flexible suspension member against longitudinal movement; means on said hanger member for suspending it horizontally from overhead securement; and an elongate and flexible suspension member having animal-engaging hooks at its opposite ends and being adapted to hang over said hanger member, longitudinally thereof, with its intermediate portion resting on the latter, its opposite end portions extending through the end slots thereof, and its hooks hanging pendant.

2. The hanger device of claim 1, wherein the hanger member is of upstanding channel formation, providing along its length for positive retention of the intermediate portion of the suspension member.

3. The hanger device of claim 2, wherein the suspension member is a link chain, and the end slots of the hanger member are adapted to snugly receive respective links of said chain.

4. The hanger device of claim 3, wherein the anchoring means for the flexible suspension member comprise respective posts upstanding rigidly from the bottom of the channel of the hanger member adjacent the inner terminations of the respective slots and adapted to pass through respective links of said chain.

5. The hanger device of claim 4, wherein the hanger member is made up of at least two mutually independent, longitudinal sections telescopically interfitted, so as to be extendible and retractable at will, for adjusting the length of the device to animals of various sizes.

6. The hanger device of claim 5, wherein locking means are provided between the interfitted sections of the hanger member, for rigidly retaining any given adjusted position of said hanger member.

7. The hanger device of claim 1, wherein the suspension member is a link chain and the end slots of the hanger member are adapted to snugly receive respective links of said chain.

8. The hanger device of claim 7, wherein the anchoring means for the chain comprise respective posts extending rigidly from the hanger member adjacent the inner terminations of the respective slots and adapted to pass through respective links of said chain.

9. A hanger device for animals, comprising an elongate and rigid hanger member; posts securely rooted in and projecting from said hanger member adjacent respective opposite ends thereof with free termini for immediately receiving and anchoring opposite end portions of a longitudinally placed, flexible, suspension member; means on said hanger member for suspending it horizontally and independently of said suspension member from overhead securement; and an independent elongate and flexible, suspension member having animal-engaging hooks at its opposite ends and being adapted to hang over said hanger member, longitudinally thereof, with its intermediate portion resting on the latter and its opposite end portions engaging said posts in immediately separable manner and with its hooks hanging pendant.

10. The hanger device of claim 9, wherein the hanger member is adjustable in length.

References Cited in the file of this patent

UNITED STATES PATENTS

| | | |
|---|---|---|
| 847,738 | Darnall | Mar. 19, 1907 |
| 901,304 | Murphy | July 11, 1908 |
| 1,030,683 | Roskopf | Dec. 15, 1911 |
| 1,350,632 | Albrecht | Aug. 24, 1920 |
| 2,809,069 | Neel | Oct. 8, 1957 |